United States Patent [19]

Decato et al.

[11] Patent Number: 4,763,394
[45] Date of Patent: Aug. 16, 1988

[54] PUSH PULL PRESS FOR ASSEMBLY AND DISASSEMBLY OF DRIVE SHAFTS

[76] Inventors: Raymond L. Decato, P.O. Box 579, Grantham, N.H. 03753; Rodney R. Decato, 258 Mechanic St., Lebanon, N.H. 03766; Ronald R. Decato, General Delivery, Grantham, N.H. 03753

[21] Appl. No.: 141,143
[22] Filed: Jan. 6, 1988
[51] Int. Cl.⁴ .............................. B23P 19/04
[52] U.S. Cl. ................................. 29/252
[58] Field of Search ............ 29/252, 251, 237, 464, 29/525; 269/296, 902

[56] References Cited

U.S. PATENT DOCUMENTS

| | | | |
|---|---|---|---|
| 3,824,665 | 7/1974 | Saito | 29/252 |
| 4,477,956 | 10/1984 | Mefford | 29/252 |
| 4,558,502 | 12/1985 | Gossmann et al. | 29/252 |
| 4,704,780 | 11/1987 | Moffett | 29/252 |

Primary Examiner—Robert C. Watson
Attorney, Agent, or Firm—Janine J. Weins; Michael J. Weins

[57] ABSTRACT

The present invention is directed to a Push Pull Press Machine for use in assembling, disassembling and rebuilding drive shafts. The machine is provided with a bed and fixtures for holding and positioning both ends for precise and easy alignment of the shaft. The present invention is directed to a machine which will allow drive shafts having different configurations to be quickly and easily disassembled, aligned and/or assembled.

8 Claims, 5 Drawing Sheets

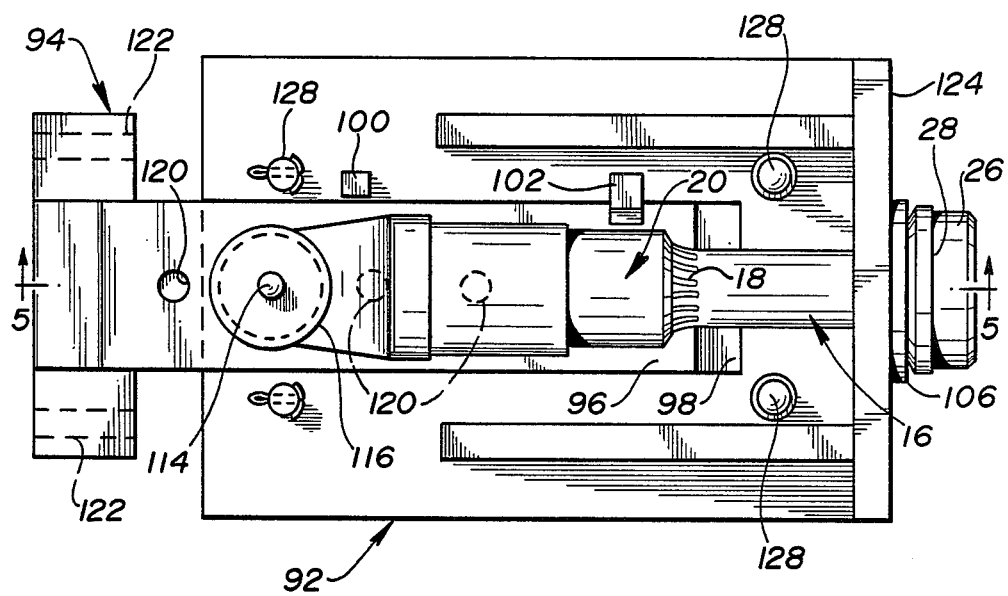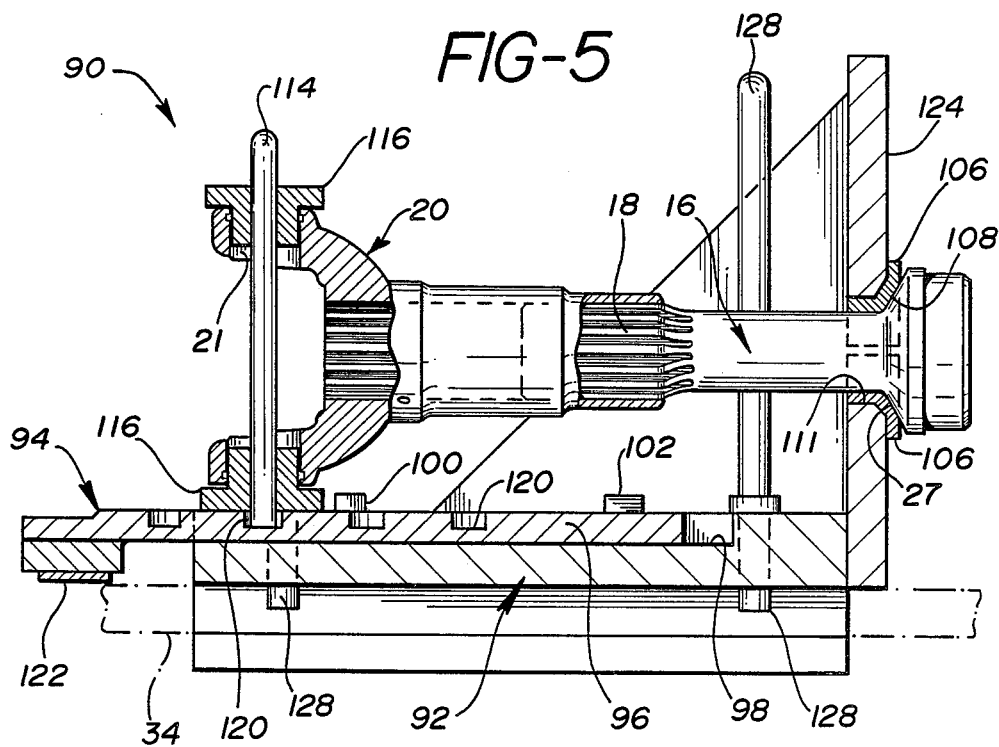

PUSH PULL PRESS FOR ASSEMBLY AND DISASSEMBLY OF DRIVE SHAFTS

FIELD OF INVENTION

The present invention is directed to a machine which can both assemble and disassemble drive shafts. The machine of the present invention was earlier described in disclosure document No. 71,350, dated June 8, 1987 and entitled UNIVERSAL PUSH PULL PRESS.

BACKGROUND

Drive shafts are used to transfer rotational motion. In trucks and automobiles, drive shafts can be used to transfer the rotation motion generation by the engine. Drive shafts can be used in machines such as rolling mills and printing presses to transfer the motion generated by the motor to various of the operational components.

A drive shaft is a tubular or solid shaft member which has been provided at one end with means for coupling to a rotating drive source and at the other end with means for couple to a driven component. Frequently a tube yoke is provided to one end, and a slip stub shaft is provided at the other end to slidably engage a slip yoke. Most commercial drive shafts are formed from three components, a tubular shaft member and two end configurations.

Drive shafts come in a variety of sizes and may vary from small shafts used in small machines to the shafts used in small lawn tractors to the very large drive shafts used in large trucks and off the road vehicles.

During service the individual components of a drive shaft will be subject to wear and corrosion, and may be accidentally damaged. Because the individual components, and in particular, the end configuration, are expensive precision items it is cost effective to save those components which have not been worn excessively and remain operative. For this reason it is frequently desired to disassemble a drive shaft to salvage or replace one or more of the components.

A drive shaft can be disassembled by cutting the welds, holding the ends onto the shaft, and then through application of a tensile load removing one or both ends.

A drive shaft is assembled by pressing and subsequently welding onto a tubular shaft member, end components having the desired configurations.

The efficiency with which a drive shaft transmits rotational motion and the rate of wear are a function of the balance and alignment of the drive shaft. If a drive shaft is out of balance excessive vibration will result. Excessive vibration which can cause excessive wear in the drive train components including the differential and transmission. Further an unbalanced drive shaft can cause vibrations in the vehicle and be noisy.

To assemble a drive shaft one or both replacement ends are placed in contact with the shaft, the shaft is secured, the ends are aligned with respect to the shaft axis, and a force is applied to press the ends onto the shaft. If the shaft and the end configurations are not properly aligned the components will not have a common axis of rotation. This can lead to inefficient transfer of rotational motion and excessive wear and vibration. To assure that the individual components are aligned each component should be aligned with respect to a common axis of rotation. If each component is aligned with respect to the same axis then all components would be aligned with respect to each other and the resulting shaft will transfer motion in an efficient manner.

Using most of the current processes for the assembly of three piece drive shafts each end configuration must be separately affixed and aligned to the shaft. Many of the machines require that the shaft be secured to a bed, the end configuration be placed in a jig pressed on to the shaft and then for the second end configuration to be positioned the shaft must be removed from the bed, turned end for end and process repeated, the second end configuration placed in the appropriate jig aligned with respect to the shaft and pressed onto the shaft. This operation which requires securing the shaft for each end configuration needs to be pressed on, can be time consuming and can lead to errors of alignment, the shaft has to be positioned and secure for each end.

The process for disassembling and assembling drive shafts is time consuming. The time to disassemble the main drive shaft for a ten wheel dump truck, such drive shaft having an outside diameter of 4.095 inches with a wall thickness of 0.180 inches, and a length between about 48 inches, and having a 1710 series tube yoke, and a 1710 series stub shaft about 45 minutes using conventional technology. The accuracy with which drive shafts can be aligned using conventional technology, the alignment can vary by 3/16 and ¼.

The efficiency with which the rotational force of the driving element is transferred to the driven element, is in addition to being a function of the drive shaft components, a function of the weld configurations. If the axis of rotation of the end configuration and the shaft are not common the shoulder of the end configuration may not be parallel to a plane perpendicular to the shaft axis. This can result in a variable separation between the end of the tube shaft and the collar of the end configuration. Such variation in the separation between the end configuration shoulder and the tube shaft can lead to a variation in weld metal volume around the circumference of the shaft. This variation in volume of weld around the circumference of the shaft will cause a variation in weight as a function of circumferential position which can unbalance the drive shaft.

To compensate for the variations in circumferential weight subsequent to assembly the drive shaft must be balanced by the placement of steel weights attached to the shaft. The steel weights increase the weights increase the weight of the drive shaft and thereby decreasing its efficiency and also add asymmetry to the weight distribution which can contribute to the ware.

Several patents are directed to methods and equipment for use in the assembly and disassembly of drive shafts. Among these are U.S. Pat. No. 4,571,807 entitled DRIVESHAFT REBUILDING MACHINE of Gordon E. Heinz, Arthur W. Henke and Vernon J. Burzan. The '807 patent teaches a drive shaft rebuilding machine for installing an end piece on a drive shaft tube. The machine is provided with centering clamps for positioning and securing the drive shaft tube. End components are secured in a fixture on the shaft tube or jig which firmly engages a conventional yoke and/or spline and can be moved so as to align the end piece with respect to the drive shaft tube. The end configuration is pressed into the drive shaft tube by means of a hydraulic cylinder. The device of the '807 patent is provided with multiple rotating crank mechanisms for manually adjusting and aligning of the drive shaft tubes. The machine of the '807 patent centers the shaft by means of tapered side support members that are cranked in to firmly engage the shaft. Depending on the skill of the operator and the force with which he turns the crank it is possible to distort the shaft and or to place a slight warp in the shaft. Further if the shaft is grasped when the shaft is rotated with respect to the clamps and held too tightly the pressing operation which is used to place the fixtures into the shaft could cause further distortion of the shaft.

U.S. Pat. No. 3,758,098 entitled MACHINE FOR WORKING DRIVE SHAFTS of Mark Vrialakas teaches a machine for working simultaneously on both the head stock and tail stock of an automobile drive shaft by applying a compressive load to the drive shaft tube in combination with the end pieces. The head and tail stock are held in position by clamping studs. A special complimentary yoke is used to engage the universal. A set screw is provided to hold the hub of the complimentary yoke into a recess in a collar. The machine of the '098 patent permits only limited adjustment with respect to centering the head and tail stocks and allows for only limited variability with respect to shaft diameter, and with respect to head and tail stock configuration. The machine of the '098 patent requires multiple manual operations to align the shaft. Since the machine relies on manual adjustments for centering the components the accuracy with which a drive shaft can be aligned depends on the operator.

U.S. Pat. No. 3,880,416 entitled FIXTURE ASSEMBLY FOR REPAIR OF UNIVERSAL JOINTS of Don A. Horwitz teaches a fixture hold for securing a drive shaft tube and yoke end pieces. The fixture uses a plurality of vise rod, or bolts, for alignment. Since the device requires manual adjustment the alignment will depend on the skill of the operator and the time required to center the yoke with respect to a drive shaft can be extensive.

U.S. Pat. No. 4,459,727 entitled MACHINE FOR FABRICATING DRIVESHAFTS of Robert Burton and Glenn Parma teaches a machine for fabricating drive shafts. The tail stock is positioned and supported by a centering spindle, and the head stock is positioned and supported by a drive spindle. Rotatable locking face plates are used for mounting the spindles. Since alignment of the drive shaft is accomplished by the manual adjustment the alignment depends on the operator and the alignment process is time consuming.

In addition, to the drive shaft rebuilding machines described in the above referenced patents, several manufacturers offer machines for use in the rebuilding and disassembly of drive shafts. For example, Rockwell offers a Cut-Pull-Push-Yoke machine which is provided with a bed and a jig for holding and positioning one end. Using the Rockwell Cut-Pull-Push-Yoke machine only one end configuration at a time can be positioned and pushed into the drive shaft tube. Since the drive shaft must be removed and repositioned after the first end is pressed onto the tube if a second end is to be pressed onto the tube the alignment will depend upon the skill of the operator in repositioning the shaft and the time for assembling a drive shaft with two end configurations will be extended by the time required to remove the shaft, rotate the shaft and reaffix the shaft to the bed.

Axiline Precision Products Company offers a DRIVE LINE BALANCER for use in the assembly and disassembly of drive shafts. The DRIVE LINE BALANCER is provided with a centering ring which has three manually adjusted centering screws. The drive shaft is placed through the centering ring and the shaft is aligned by movement of the centering screws. A chuck, which can be manually aligned, is provided with a variety of fixtures for use in positioning the end configuration. By changing the fixture it is possible to position chucks of varying sizes and configurations. The machine offered by Axiline requires a variety of manual adjustments and only one end of the drive shaft can be worked on at a time.

Using conventional technology the time required for disassembling and assembling drive shafts is extensive and proper alignment requires a skilled operator. As with any job that relies on operator skill there will be a distribution of quality.

A drive shaft rebuilding machine which can accurately align the end configurations with respect to the axis of the tube shaft and thus provide a drive shaft with improved alignment and better balance when compared to prior assembly techniques can be of value.

Significant savings could be realized from the improved efficiency with which rotational motion could be transferred, the longer life of the drive shaft and the components in the drive train, and the reduced time and material required for post assembly balancing.

There is a need for a machine which has sufficient versatility, that it can readily assemble and disassemble drive shafts having a variety of different shaft sizes and end configurations.

There is a need for a drive shaft machine which will allow for the alignment of the end components with a minimum of operator input, with a high degree of reproducibility, and with a reduction in the time required for the assembly and/or disassembly.

Because the tube shaft and/or the end configurations may need to be modified or replaced, a machine which in a cost effective manner can disassemble and then reassemble a drive shaft can have value.

Further, because small shops frequently are called on to rebuild drive shafts having a variety of end configurations, shaft diameters and shaft lengths there is a need for a universal machine which can readily assemble and disassemble drive shafts of various sizes, having varying end configurations.

The present invention is directed to a machine which will allow drive shafts having different lengths, diameters, and end configurations to be quickly, accurately, reproducibility; and easily disassembled, aligned and assembled.

SUMMARY OF THE INVENTION

It is an object of the present invention to provide a Push Pull Press Machine for use in the assembly and disassembly of drive shafts.

It is an object of the present invention to provide a machine which can be readily adapted for use in the assembly and disassembly of drive shafts having various drive shaft diameters, lengths and end stock configurations.

It is an object of the present invention to reduce the time required for the assembly and disassembly of drive shafts.

It is an object of the present invention to provide a machine that, with precision and reproducibility, will align the desired end stock configurations with respect to a tube shaft during assembly of the drive shaft.

It is an object of the present invention to provide a machine which can, with a minimum of set up time, assemble drive shafts of various lengths and having different end stock configurations.

It is an object of the present invention to provide a machine which can assemble drive shafts with a high degree of accuracy and in better balance than drive shafts assembled using prior art techniques.

It is an object of the present invention to provide a drive shaft machine which can produce drive shafts which will last longer, and perform more efficiently than drive shafts produced using prior art methods.

It is an object of the present invention to provide a drive shaft assembly machine which can produce drive shafts which will cause less wear to drive shaft components, such as the universal transmission and differentials, than the wear that would be caused using drive shafts assembled using prior art technology.

It is an object of the present invention to provide a device for assuring that the separation between the shoulder of the end configuration and the end of the tube shaft is uniform and reproducible and thus produce a well balanced shaft having the end configurations affixed to the tube shaft by a weld bead of uniform circumferential weight.

It is an object of the present invention to allow drive shafts to be disassembled quickly and with the minimum of labor.

It is an object of the present invention to provide a machine which can assemble a drive shaft having uniform and reproducible weld beads affixing the end components.

It is an object of the present invention to provide a drive shaft which has the end configurations precisely aligned with respect to each other.

It is an object of the present invention to provide a machine which can assemble a drive shaft with minimum operator skills.

It is an object of the present invention to provide means whereby a drive shaft can be assembled with two tube yoke ends, two split stub shaft ends or one tube yoke end and one split stub shaft end.

It is a further object of the present invention to provide means for centering the axis of a tube shaft on a bed by use of geometric principles and thereby relieving the operator of the burden of centering and aligning the drive tube shaft.

These and other objects of the present invention will become apparent to one skilled in the art from the following figures, descriptions and examples.

The present invention is directed to a push pull press machine for use in assembling and disassembling drive shafts. The machine in its simplest form is provided with one or more tube shaft support jigs, a pair of end support jigs and means for moving at least one of the end support jigs. Preferably one of the end support fixtures is a tube yoke fixture and the other end support fixture is a tail stock assembly.

Means, such as a hydraulic cylinder are provided for moving one of the end support fixtures relative to the other end support fixture.

Preferably, both the tube yoke fixture and the tail stock assembly are slidably mounted on a support track. Means are provided for applying, at the option of the operator, a compressive load or a tensile load between the fixtures.

One or more of the tube shaft support brackets are located between the tube yoke fixture and the tail stock assembly. Preferably the tube yoke fixture is attached to a hydraulic cylinder, which allows for the controlled movement of the tube yoke fixture relative to the tail stock assembly.

Each of the tube shaft support brackets is provided with one or more pairs of shaft support spacers. The tube shaft support spacers, through triangulation, center the tube shaft with respect to the center axis of two spaced apart end support fixtures. By having the tube shaft centered with respect to the center line of the end support fixtures all three major components of the assembled drive shaft, the two end configurations and the tube shaft are centered with respect to a common axis.

The end support fixtures are designed to accept, and align with respect to a common axis, a variety of drive shaft end configurations.

The tail stock assembly is formed from a stub shaft fixture and a slip yoke fixture. The stub shaft fixture utilizes a bevelled split collar to secure and center a slip stub shaft with respect to the axis of rotation of the tube shaft.

The yoke end fixture utilizes a tie down pin in combination with one or more pairs of ring spacers to center the tube yoke with respect to the axis of the tube shaft.

One of the end fixtures, and preferably the tube yoke fixture, is slidably mounted on a support track responsive to movement of a hydraulic piston.

The end fixture not connected to the hydraulic piston is provided with a tie down means, such as pins, to securely affix and rigidly attach the fixture to the support track.

By slidably moving one of the end fixtures on the support track relative to the second end fixture it is possible to apply a compressive load to the drive shaft for the purpose of assembly and a tensile load for the purpose of disassembly.

BRIEF DESCRIPTION OF THE DRAWINGS

FIG. 4 is a top plan view of a tail stock assembly in accordance with the present invention. The tail stock assembly is comprised of a stub shaft fixture and a spline yoke fixture, the fixtures can be slidably engaged and slidably separated on the support track.

FIG. 5 is a cross section of the tail stock assembly shown in FIG. 4 a long line 4—4.

FIG. 7 shows the tube yoke positioned within the fixture by means of ring spacers and held in place by means of a tie down pin.

BEST MODE FOR CARRYING THE INVENTION INTO PRACTICE

Figure 1:
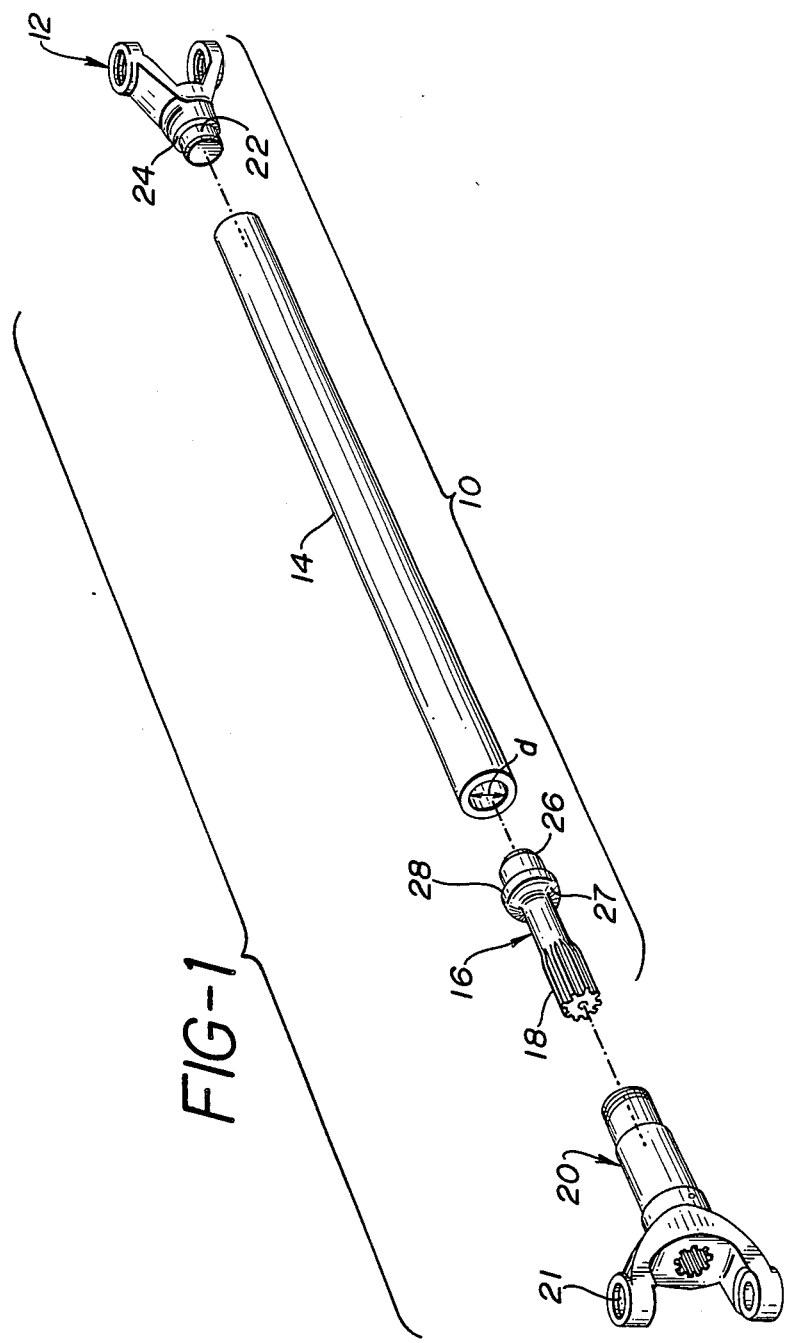
FIG. 1 is a schematic representation of an exploded view of a disassembled three component drive shaft. The drive shaft has a tube yoke, a tube shaft, a slip stub shaft. The slip stub shaft has a spline end which engages a slip yoke.

FIG. 1 is a schematic representation of a three component drive shaft 10 such as can be assembled and disassembled using the machine of the present invention. The drive shaft 10 has a tube yoke 12, a tube shaft 14, and slip stub shaft 16. The slip stub shaft 16 has a spline end 18. The spline end 18 can slidably engage the slip yoke 20.

The tube yoke 12 is provided with an extension 22, the extension 22 has an outside diameter slightly less than the inside diameter, d, of the tube shaft 14. The extension 22 of the tube yoke 12 terminates in a shoulder 24. The shoulder 24 will limit the depth of insertion of the extension 22 into the tube shaft 14.

The slip stub shaft 16 is provided with an extension 26. As with the extension 22 provided to the tube yoke 12, the extension 26 that is provided to the slip stub shaft 16 has an outside diameter which is slightly less than the inside diameter, d, of the tube shaft 14. Again like the extension 22 which is provided to the slip yoke 20, the extension 26 which has been provided to the slip stub shaft 16 terminates in a shoulder 28 between slip stub shaft 16 and shoulder 28 is a tapered portion 27. The shoulder 28 limits insertion of the slip stub shaft 16 into the tube shaft 14.

Figure 2:
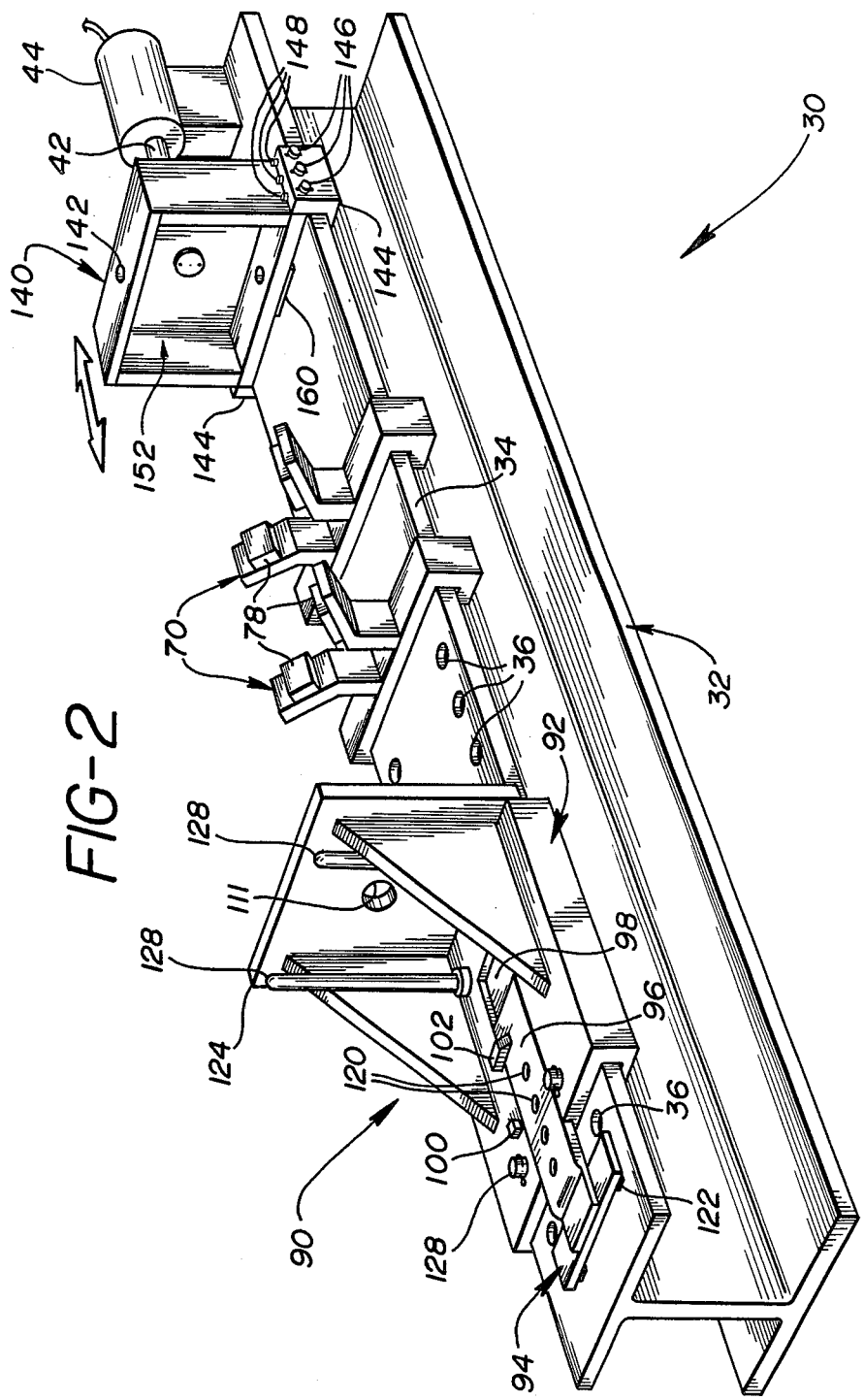
FIG. 2, is a perspective view of one embodiment of the present invention. The Push Pull Press has a base which is provided with a support track. Positioned on the support track is a tube yoke fixture, a tail stock assembly, and a series of tube shaft centering brackets. The tube yoke fixture is attached to the piston rod of a hydraulic cylinder.

FIG. 2 depicts an embodiment of a Push Pull Press Machine 30 in accordance with the present invention. The Push Pull Press 30 has a base 32 which is provided with a track 34. Slidably mounted on track 34 are a tube yoke fixture 140, a tail stock assembly 40 and two tube shaft support brackets 70. The tube yoke fixture 36 is connected to a piston rod 42 which is driven by a hydraulic cylinder 44. By selectively activating the hydraulic cylinder 44, the piston rod 42 will translate longitudinally the tube yoke fixture 140 either away from or towards the tail stock assembly 90.

To use the Push Pull Press 30 to assemble a drive shaft the tube shaft 14 shown in FIG. 1 is cradled on the tube shaft support brackets 70. A tube yoke 12 such as shown in FIG. 1 is positioned in the cavity 152 of the tube yoke fixture 140 and a slip stub shaft 16 such as shown in FIG. 1 is positioned in stub shaft fixture 92.

Further details of the components of the Push Pull Press 30 are shown in FIGS. 3, 4, 5, 6 and 7.

Figure 3:
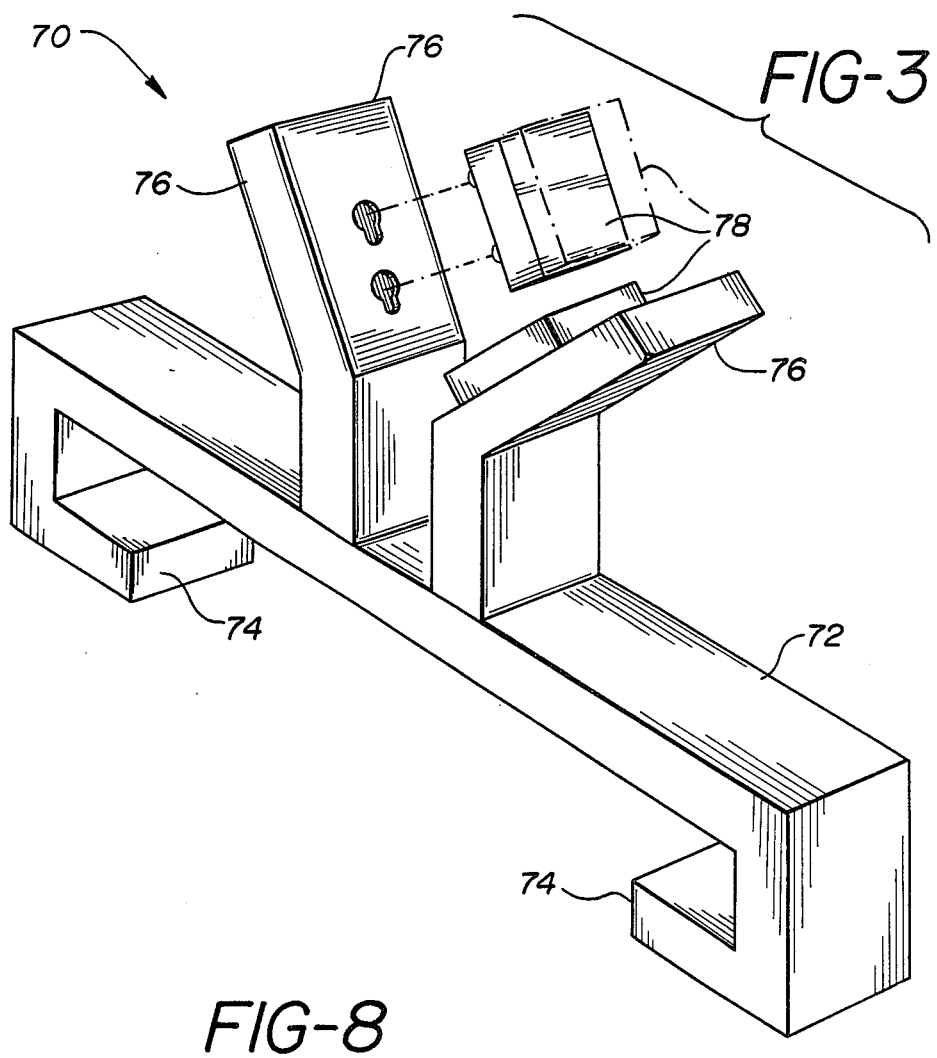
FIG. 3 is a perspective view of a tube shaft centering bracket which in accordance with the present invention is used to position and center the tube shaft.

FIG. 3 shows tube shaft support bracket 70 for use in a Push Pull Press 30 of the present invention. The tube shaft support bracket 70 has a cross member 72. The cross member 72 rides on the support track 34 as shown in FIG. 2. Extending downward from the cross member 72 are a pair of track engaging arms 74. The track engaging arms 74 encircle the edge of the track 34 and assure that the tube shaft support bracket 70 is maintained on the track 34 and is centered with respect to the track 34. Affixed to the cross member 72 and extending upward are a pair of diverging support arms 76. The diverging support arms 76 form a cradle. The cradle will position and support a tube shaft. Affixed to the diverging support arms 76 are matched pairs of spacers 78. The spacers 78 are matched to the tube shaft diameter and assure that the particular tube diameter will be centered with respect to the center axis of the tail stock assembly and the tube yoke assembly. If a drive shaft of large diameter is used a small spacer thickness will be required however if a tube shaft having a small diameter is used then very thick spacers as shown in phantom lines will be required to elevate the center of the tube shaft to the center axis of the two spaced apart end stock positioning assemblies. The spacers 78 can be removed and replaced with spacers of different thickness depending on the drive shaft diameter.

To assure that the tube shaft is aligned with respect to a plane that would vertically bisect the track and the base of the Push Pull Press 30, matched pairs of equal thickness spacers 78 are used.

FIG. 4 is a plan view of the tail stock assembly 90 in accordance with the present invention. The tail stock assembly 90 is formed from a stub shaft fixture 92 and a slip yoke fixture 94 which are engaged by means of a tongue 96 which is provided to the slip yoke fixture 94. The tongue 96 slides within a groove 98 which is provided in the stub shaft fixture 92. The tongue 96 is maintained in the groove 98 by stop 100 which are provided on the stub shaft fixture 92 and a limit arm 102 which is provided to the tongue 96. The stop 100 in combination with the limit arm 102 limit movement of the tongue 96. The extension 102 will encounter stop 100 when the stub shaft fixture 92 and the slip yoke fixture 94 are forced apart. To disengage the stub shaft fixture 92 from the slip yoke fixture 94 the tongue 96 need only be elevated from the track to an extent sufficient to allow the stop limit arm 102 to clear the stop 100.

FIG. 5 shows a cross sectional view along line 5—5 of the tail stock assembly 90 shown in FIG. 4. A slip stub shaft 16 is held in the stub shaft fixture 92 by means of a beveled split collar 106. The bevel of the beveled split collar 106 is in contact with the tapered portion 27 of the shoulder 28 which is provided to the slip stub shaft 16. Once the bevel split collar 106 has been placed around the stub shaft 16 the stub shaft 104 in combination with the split collar 106 are placed through a stub shaft passage 111.

Alignment of the slip stub shaft 16 is assisted by means of a slip yoke 20 which is positioned and centered in the slip yoke fixture 94. The slip yoke 20 is held in the slip yoke fixture 94 by means of a slip yoke pin 114. The slip yoke 20 is centered in the slip yoke fixture 94 by the appropriate placement of slip yoke spacers 116. The slip yoke spacer 116 has a cross sectional contour such as a thick brimmed top hat where in the outside diameter of the crown is slightly less than the inside diameter of the yoke passage 21 and the height of the crown is slightly greater than the depth of the yoke passage 21. If a small slip yoke is used, a slip yoke spacer 116 having a thicker brim would be required while if a large slip yoke is used a slip yoke spacer 116 having a thin brim would be required. The slip yoke pin 114 passes through the center of the slip yoke spacers 116 and into a recess 120 provided to the base of the slip yoke fixture 94.

The slip yoke fixture 94 rides along the track 34 shown in FIG. 2 on two rocker pieces 122 which are provided to the bottom of the slip yoke fixture 94 and on the base of the tongue 96. Thus the slip yoke fixture 94 is stabilized by three point loading and readily-aligns with respect to the center axis of the shaft.

After the stub shaft 16 has been positioned by means of the appropriate beveled split collar 106 in the passage 111 of the face plate 124 of the stub shaft fixture 92 an appropriate slip yoke 20 which has been positioned in the slip yoke fixture 94 is engaged with the spline 18 of the stub shaft fixture 16 by moving the slip yoke fixture 94 along the tracks towards the stub shaft fixture 92. Tie down pins 128 secure the stub shaft fixture 92 to the track 34 as shown in FIG. 2 by way of recesses 36.

Figure 6:
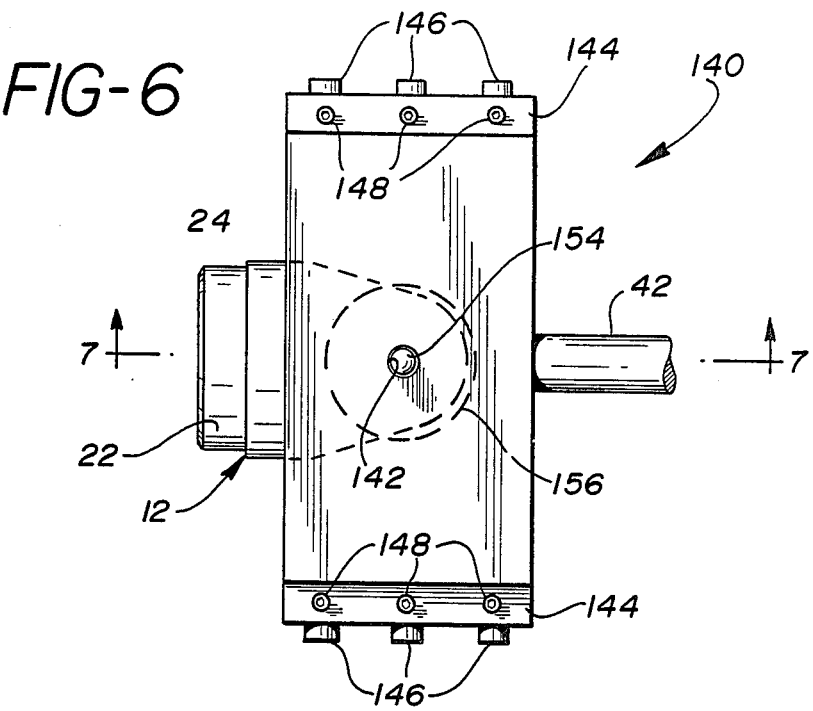
FIG. 6 is a schematic representation of a plan view of a tube yoke fixture. The tube yoke is maintained in position in the tube yoke assembly by means of a tie down pin and the assembly is maintained in proper registry on the tracks by means of adjustable side gripping means.

FIG. 6 is a plan view of the tube yoke fixture 140 in accordance with the present invention. The tube yoke fixture 140 is provided with a centrally disposed passage 142. The tube yoke fixture 140 is maintained in a position by means of grabber arms 144. The grabber arms 144 are affixed at one end to the base of the tube yoke fixture 140 by means of bolts 146. The grabber 144 can be adjusted to accommodate for variations in track thickness by adjustment of set bolts 148.

Figure 7:
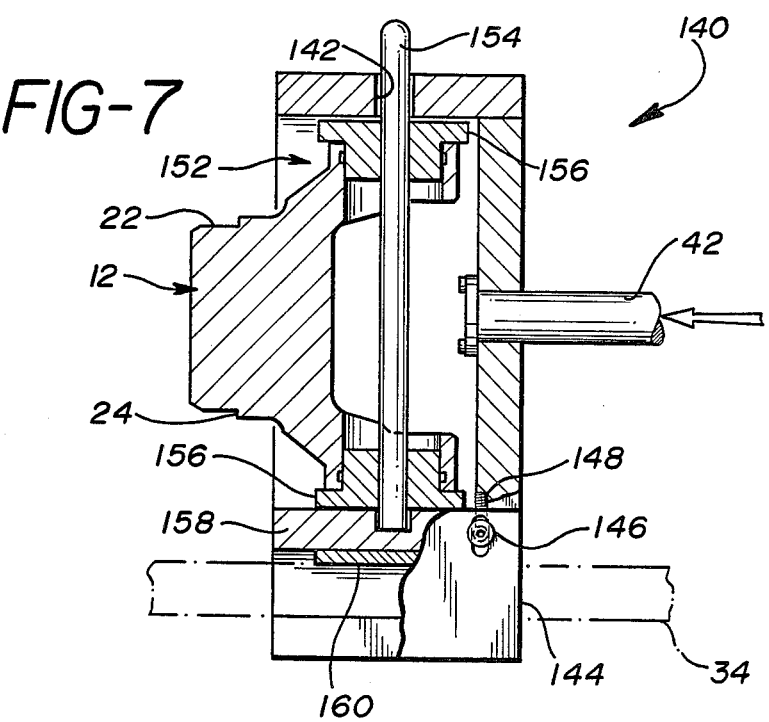
FIG. 7 is a cross section of the tube yoke assembly of FIG. 6 along line 7—7.

FIG. 7 shows a cross section of the tube yoke fixture 140 along line 7—7 of FIG. 6. A tube yoke 12 is centered within a cavity 152 which has been provided within the tube yoke fixture by a tube yoke pin 154 in combination with yoke spacers 156. The tube yoke pin 154 passes through the central passage 142 in the frame of the yoke fixture 140, through a yoke spacer 156, through the yoke 150, through a yoke spacer 156, and into the base 158 of the yoke fixture 140.

If yokes of different sizes are to be positioned in the yoke fixture, different sized matched pairs of yoke spacers 156 must be placed above and below the yoke 150 to assure that the yoke 150 is centered in the tube yoke assembly 140.

The travel of the yoke pin is terminated in the fixture.

The tube yoke fixture 140 slides on a track 34 as shown in FIG. 2 on a center pad support 160.

Figure 8:
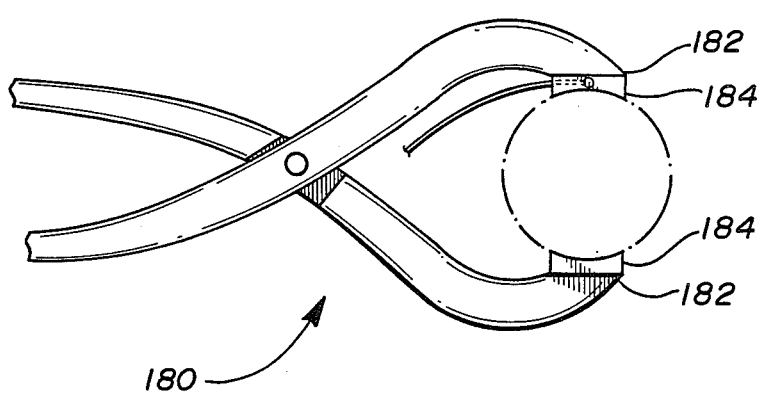
FIG. 8 is a plan view of a gap clamp which is used to assure that a uniform gap is maintained between the end of the tube shaft and the shoulder of the individual end components.

FIG. 8 shows a gap clamp 180 for use in conjunction with the Push Pull Press of the present invention during the assembly of a drive shaft. The gap clamp 180 has the structure and appearance of a standard locking ply area with the exception that the ends 182 of the gap clamp 180 are provided with spacer segments 184. The spacer segments are on their extreme end, provided with a radius R that is approximately equal to the radius of a tube shaft such as the tube shaft 14 shown in FIG. 1. The spacer segments 184 have a thickness that is equal to the separation that is desired between the end of the tube shaft and a shoulder of one of the end components such as the shoulder 28 on the slip stub shaft or the shoulder 24 on the tube yoke. The gap clamp 180 can be placed around one of the extensions of the end components so as to limit the depth of insertion of the tube shaft.

When a drive shaft is being assembled the piston rod 42 attached to the tube yoke fixture 140 as shown in FIG. 2 is extended so as to causes a compressive load to be applied to all components of the drive shaft and thereby force the tube yoke 12 and the slip stub shaft 16 together and After the extensions 22 and 26 which are provided to the end components have entered the tube shaft a gap clamp 180 such as shown in FIG. 8 can be placed around the extension and contiguous to the shoulder and by means of the locking plier feature lock in place. After the gap clamp 180 has been locked around the extension the travel of the piston rod 42 is continued until such time as the shoulder of the extension and the end of the drive shaft tube are both in contact with the gap clamp. At this point the gap clamp is removed and the assembled drive shaft is ready for welding.

In a preferred embodiment of the present invention an automatic gap clamp can be inserted to assure a constant predetermined gap is maintained between the shoulder of both end configurations and the ends of the drive shaft tube. The automatic gap clamp is provided with feedback means which feed a turn off signal back to the hydraulic piston once the gap clamp has been contacted on both sides of an extension 182 by the shoulder of the end configuration and by the tube shaft.

While the present invention has been described in terms of particular configurations and preferred embodiments it can be appreciated that substitution of materials and minor modifications in design can be made by one skilled in the art without departing from the spirit of the invention.

What we claim is:

1. A push pull press machine for use in the assembly and disassembly of three component drive shaft, such machine comprising:
   a support track;
   at least one tube shaft support fixture positioned on said support track;
   a tube yoke fixture slideably mounted on said support track, said tube yoke fixture having a center cavity and being provided with a tube yoke tie down pin and a pair of tube yoke spacers;
   a stub shaft assembly slideably mounted on said support track, said stub shaft assembly being comprised of a slip stub shaft fixture slideably engaging and a slip yoke fixture;
   means for rigidly affixing said stub shaft assembly to said support track; and
   means for moving the tube yoke fixture relative to the stub shaft assembly.

2. The push pull press of claim 1 further comprising a central pad support attached to said yoke fixture and slideably engaging said support track.

3. The push pull press of claim 2 wherein said stub shaft fixture is further comprised of a passage and a beveled split collar which slideably engages said passage.

4. The push pull press of claim 3 wherein said slip stub shaft fixture further comprises the rocker pads attached to the slip yoke fixture and slideably engaging said support track, a slip yoke pin, and slip yoke spacers slideably engaging said slip yoke and said slip yoke pin.

5. The push pull press of claim 4 wherein each of said tube shaft support fixture further comprises support arms, and paired spacers which slideably engage said slide arms.

6. The push pull press of claim 6 further comprising a gap clamp.

7. The push pull press of claim 5 wherein said means for affixing said stub shaft assembly to said support track comprises pins which pass through said stub shaft assembly and engage said support track.

8. The push pull press of claim 7 wherein said means for moving said tube yoke fixture is a hydraulic cylinder.

* * * * *